United States Patent [19]

Schwab et al.

[11] Patent Number: 4,792,504

[45] Date of Patent: Dec. 20, 1988

[54] LIQUID CONTAINING POLYMER NETWORKS AS SOLID ELECTROLYTES

[75] Inventors: Gerhart Schwab; Mei-Tsu Lee, both of Chillicothe, Ohio

[73] Assignee: MHB Joint Venture, Dayton, Ohio

[21] Appl. No.: 98,356

[22] Filed: Sep. 18, 1987

[51] Int. Cl.$^4$ ............................................. H01M 6/16
[52] U.S. Cl. .................................... 429/192; 429/190; 252/62.2
[58] Field of Search ........................ 429/192; 252/62.2

[56] References Cited

U.S. PATENT DOCUMENTS

| | | | |
|---|---|---|---|
| 3,734,876 | 5/1973 | Chu | 260/33.6 R |
| 4,303,748 | 12/1981 | Armand et al. | 429/192 |
| 4,357,401 | 11/1982 | Andre et al. | 429/192 |
| 4,471,037 | 9/1984 | Bannister | 429/191 |
| 4,556,614 | 12/1985 | Le Mehaute et al. | 429/192 X |
| 4,654,279 | 3/1987 | Bauer et al. | 429/192 |

FOREIGN PATENT DOCUMENTS 0145498 6/1985 European Pat. Off. ............ 429/192

OTHER PUBLICATIONS

"Poly(ethylene Oxide) Electrolytes for Operation at Near Room Temperature", Journal of Power Sources, 14 (1985) 13–21, Kelly et al.

"Polymer Solid Electrolytes–An Overview", Solid State Ionics 9 & 10(1983) 745–754, Armand.

*Primary Examiner*—Brian E. Hearn
*Assistant Examiner*—Stephen J. Kalafut
*Attorney, Agent, or Firm*—Smith & Schnacke

[57] ABSTRACT

A solid polymeric electrolyte comprising a continuous network of crosslinked polyethylene oxide containing an ionic conducting phase which includes a metal salt and a dipolar aprotic solvent.

8 Claims, No Drawings

LIQUID CONTAINING POLYMER NETWORKS AS SOLID ELECTROLYTES

BACKGROUND OF THE INVENTION

The present invention relates to a polymer network containing ion conductive liquids for use as an electrolyte in solid state electrochemical cells.

Presently, solid state electrochemical cells are the subject of intense investigation and development. These cells are described extensively in the patent literature. See, for example, U.S. Pat. Nos. 4,303,748 to Armand et al (1981); 4,589,197 to North (1986); and 4,547,440 to Hooper et al (1985). These cells are characterized by an electrolyte which is a solid solution of an ionic compound dissolved within a plastic macromolecular material.

One problem which research efforts have attempted to overcome in the design of solid state cells is the poor conductivity of polymeric electrolytes at room temperature and below. In many cases, the cells which have been designed to date are used at elevated temperatures due to the low conductivity of the electrolyte at ambient temperatures.

A polymeric electrolyte should provide a combination of both high ionic conductivity and good mechanical strength. Unfortunately, there is a tendency for these two properties to oppose one another. Attempts to increase conductivity usually involve a reduction in molecular weight and result in fluid or mechanically weak films. Techniques, such as crosslinking, increase film strength but generally result in a loss in conductivity.

One effort to improve the electrolyte for a solid state cell is described in Bauer et al, U.S. Pat. No. 4,654,279. This patent discloses a solid polymeric electrolyte which is a two phase interpenetrated network of a mechanically supporting phase of a continuous network of a crosslinked polymer and an ionic conducting phase comprising a metal salt of a complexing liquid polymer such as liquid polyethylene oxide complexed with a lithium salt. As explained in the Bauer et al patent, the mechanically supporting phase forms a matrix which supports an interpenetrating ionically conducting liquid polymer phase which provides continuous paths of high conductivity throughout the matrix. Representative examples of the mechanically supporting phase described in the Bauer et al patent are epoxies, polyurethanes, polyacrylates, polymethacrylates, polystyrenes and polyacrylonitriles.

SUMMARY OF THE INVENTION

The present invention relates to an improved solid state electrochemical cell in which the electrolyte is crosslinked polyethylene oxide charged with a solution of a metal salt in an aprotic solvent. The electrolytes of the present invention are capable of providing conductivities on the order of $2 \times 10^{-5}$ $(\Omega cm)^{-1}$ at room temperature.

DETAILED DESCRIPTION OF THE INVENTION

In accordance with the present invention, crosslinking of the polyethylene oxide (PEO) continuous phase and selection of the solvent for the liquid phase are carefully controlled to obtain a highly conductive electrolyte.

The PEO continuous phase is preferably crosslinked using a polyacrylate crosslinking agent. These crosslinking agents are described in more detail in U.S. Pat. No. 3,734,876 where they are generally represented by the formula

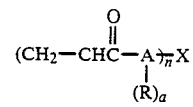

where A is nitrogen or oxygen; n is 2 or greater, R is hydrogen, C1–C6 alkyl, or C6–C14 aryl; X is CyH2y or —CyH2y(OCyH2y)m— where y is 2 to 10, m is 1 to 50 and when A is oxygen a is o and when A is nitrogen a is 1. Representative examples include poly(ethylene glycol) diacrylate, neopentylglycol diacrylate, methylene bisacrylamide, butylene glycol diacrylate, etc. The crosslinking agent is reacted with the PEO in an amount of about 1 to 10 parts per 100 parts PEO in the continuous phase and more preferably 3 to 6 parts per 100 parts PEO. The degree of crosslinking is controlled such that the film retains an amorphous character and has the necessary mechanical strength.

A free radical catalyst is required for the reaction such as acetyl peroxide or 2,2'-azobis(2-methylpropionitrile).

The PEO forming the continuous phase preferably has a molecular weight of about $2 \times 10^5$ to $10^6$.

Examples of dipolar aprotic solvents useful in the invention are dipolar solvents such as propylene carbonate, γ-butyrolactone, 1,3-dioxolane, 2-methyl-tetrahydrofuran and the less dipolar poly(ethylene glycol) dimethylether. The preferred solvents are dimethyl ethers of glycols such as poly(ethylene glycol) dimethylether (PEGDME) because they are chemically similar to the crosslinked phase and they do not attack anode materials such as lithium. A less expensive form of these solvents is known as glymes. Examples of such glymes are tetraglymes and hexaglymes. Preferably, the solvent has a dielectric constant of at least 6.

Examples of metal salts useful in the present invention include those conventionally used in solid state batteries. Useful examples are provided in U.S. Pat. No. 4,303,748 to Armand and include sodium, potassium and lithium salts of anions selected from the group consisting of $I^-$, $Br^-$, $SCN^-$, $ClO_4^-$, $BF_4^-$, $PF_6^-$, $AsF_6^-$, $CF_3CO_2^-$ and $CF_3SO_3^-$. Specific examples are $LiClO_4$, $NaClO_4$, $LiF_3CSO_3$ and $LiBF_4$. Preferably, the salt is dissolved in the solvent in an amount which does not exceed its solubility limit. Depending on the nature of the solvent the salt may be used in amounts ranging from about 40 to 80% by weight of the solvent.

In solid state electrochemical cells, the ratio of the crosslinked continuous phase to the included liquid phase is designed to provide the desired combination of conductivity and mechanical strength. Preferably the weight ratio of the continuous crosslinked phase to the liquid phase is about 40:60 to 20:80 and still more preferably about 30:70 to 20:80.

In one method to prepare the ion-conductive electrolyte film, a solution of PEO solvent, crosslinking agent and a thermal initiator in an inert organic is heated under nitrogen to effect the crosslinking of the PEO. The resulting viscous solution contains the crosslinked matrix. Portions of this matrix solution are mixed with a solution of the electrolyte salt in the dipolar aprotic solvent and the organic solvent for the matrix material is caused to evaporate. These steps result in a solid film of the matrix containing the liquid conductive phase. This method requires that there be a large differential in the vapor pressure of the first solvent and the aprotic solvent such that after evaporation of the former, the latter remains in the film.

In another potentially useful method a crosslinked film of PEO is immersed in a solution of the salt and aprotic solvent. In this method, a solution of PEO in benzene, the crosslinking agent, a free radical catalyst, is reacted, the mixture poured into a mold and the benzene allowed to evaporate. The film is then immersed in a solution of the salt in aprotic dipolar solvent.

The solid electrolyte of the present invention can be used in various electrochemical cells. A preferred cell consists of an alkali metal anode and an intercalary cathode having the solid electrolyte therebetween. Such structures can also employ current conducting backing layers, insulating layers and/or bipolar electrode connections in a manner known in the art. A particularly useful anode is lithium foil.

The cathode preferably includes an intercalation or insertion metal compound. These compounds are well known in the art and include transition metal oxides, sulfides, selenides, etc. Representative materials are vanadium oxides such as $V_2O_5$ and $V_6O_{13}$, $TiS_2$. The cathode may also contain an electronically conductive material such as graphite or carbon black. These materials may be dispersed in a binder such as PEO, poly(ethylene glycol) diacrylate polymer or the film described in this invention.

The invention is illustrated in more detail by the following non-limiting examples.

EXAMPLE 1

In a three-necked flask 10 g of poly(ethylene oxide) of M.W. 600,000 in 200 ml benzene containing 0.6 g poly(ethylene glycol) diacrylate (M.W. 302) and 100 mg 2,2'-azobis(2-methylpropionitrile) was purged with nitrogen gas, and the mixture was stirred and heated to 60 C. and kept there for 6 hours under a nitrogen atmosphere. The flask was then stoppered and allowed to drift to room temperature and left overnight. The viscous solution was poured into moulds and the benzene evaporated under ambient conditions to make films ready to absorb Li salt solutions in aprotic dipolar solvents. The above viscous solution (10 g) was mixed with 0.5 g poly(ethylene glycol) 400-dimethyl ether. This mixture was poured into molds at ambient conditions. A whitish polymer film consisting of 50% (weight) matrix and 50% PEG-dimethyl ether (liquid) resulted.

EXAMPLE 2

In another example 20 g matrix solution was mixed with 0.390 g lithium trifluoromethane sulfonate in 1.0 g poly(ethylene glycol) 400-dimethylether. To ensure lithium salt solution 10 ml of methanol was added. This clear solution formed whitish polymer films under ambient conditions. The films were hygroscopic and turned clear and viscous (sticky) after prolonged exposure to ambient air. They returned to white solid in a desiccator under reduced pressure.

Having described the invention in detail and by reference to preferred embodiments thereof, it will be apparent that modifications and variations are possible without departing from the scope of the invention defined in the appended claims.

What is claimed is:

1. A two phase solid polymeric electrolyte comprising a continuous network of crosslinked polyethylene oxide and an ionic conducting phase which includes a metal salt and a dipolar aprotic solvent wherein said polyethylene oxide is crosslinked by reaction with a polyacrylate crosslinking agent in an amount of about 1 to 10 parts crosslinking agent per 100 parts polyethylene oxide and said aprotic solvent is selected from the group consisting of propylene carbonate, gamma-butyrolactone, 1,3-dioxolane, 2-methyl-tetrahydrofuran, dimethyl ethers of glycols, and glymes, and said salt is a lithium salt, said solvent having a dielectric constant of at least 6.

2. The solid electrolyte of claim 1 wherein said aprotic solvent is poly(ethylene glycol) dimethyl ether.

3. A solid state electrochemical cell comprising a lithium metal anode, a cathode of an intercalation compound, and a solid electrolyte, said solid electrolyte being a two phase solid polymeric electrolyte comprising a continuous network of crosslinked polyethylene oxide and an ionic conducting phase which includes a metal salt and a dipolar aprotic solvent wherein said polyethylene oxide is crosslinked by reaction with a polyacrylate crosslinking agent in an amount of about 1 to 10 parts crosslinking agent per 100 parts polyethylene oxide and said aprotic solvent is selected from the group consisting of propylene carbonate, gamma-butyrolactone, 1,3-dioxolane, 2-methyl-tetrahydrofuran, dimethyl ethers of glycols, and glymes, and said salt is a lithium salt, said solvent having a dielectric constant of at least 6.

4. The electrochemical cell of claim 3 wherein said aprotic solvent is a glyme.

5. The eletrochemical cell of claim 3 wherein said aprotic solvent is poly(ethylene glycol) dimethyl ether.

6. An electrochemical device comprising first and second electrodes having a solid electrolyte therebetween, said electrolyte being a two phase solid polymeric electrolyte comprising a continuous network of crosslinked polyethylene oxide and an ionic conducting phase which includes a metal salt and a dipolar aprotic solvent wherein said polyethylene oxide is crosslinked by reaction with a polyacrylate crosslinking agent in an amount of about 1 to 10 parts crosslinking agent per 100 parts polyethylene oxide and said aprotic solvent is selected from the group consisting of propylene carbonate, gamma-butyrolactone, 1,3-dioxolane, 2-methyl-tetrahydrofuran, dimethyl ethers of glycols, and glymes, and said salt is a lithium salt, said solvent having a dielectric constant of at least 6.

7. The electrochemical device of claim 6 wherein said aprotic solvent is a glyme.

8. The electrochemical device of claim 6 wherein said aprotic solvent is poly(ethylene glycol) dimethyl ether.

* * * * *